June 11, 1929.  G. S. MESSINGER  1,716,970
METHOD AND APPARATUS FOR DUSTING INSECTICIDE
AND FUNGICIDE POWDERS UPON PLANTS
Filed Nov. 28, 1927  4 Sheets-Sheet 1
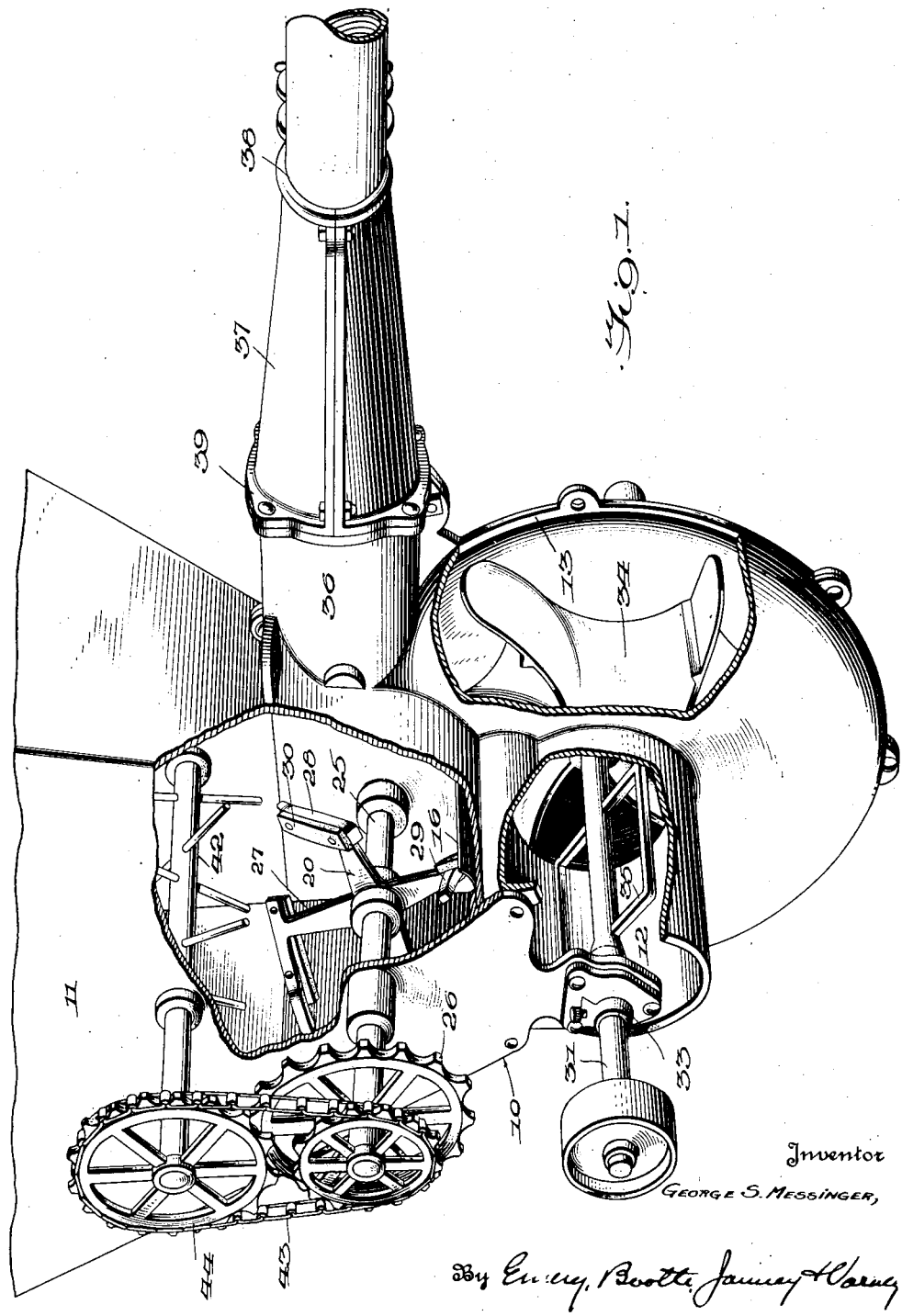
Inventor
GEORGE S. MESSINGER,
By Emery, Booth, Janney & Varney
Attorney

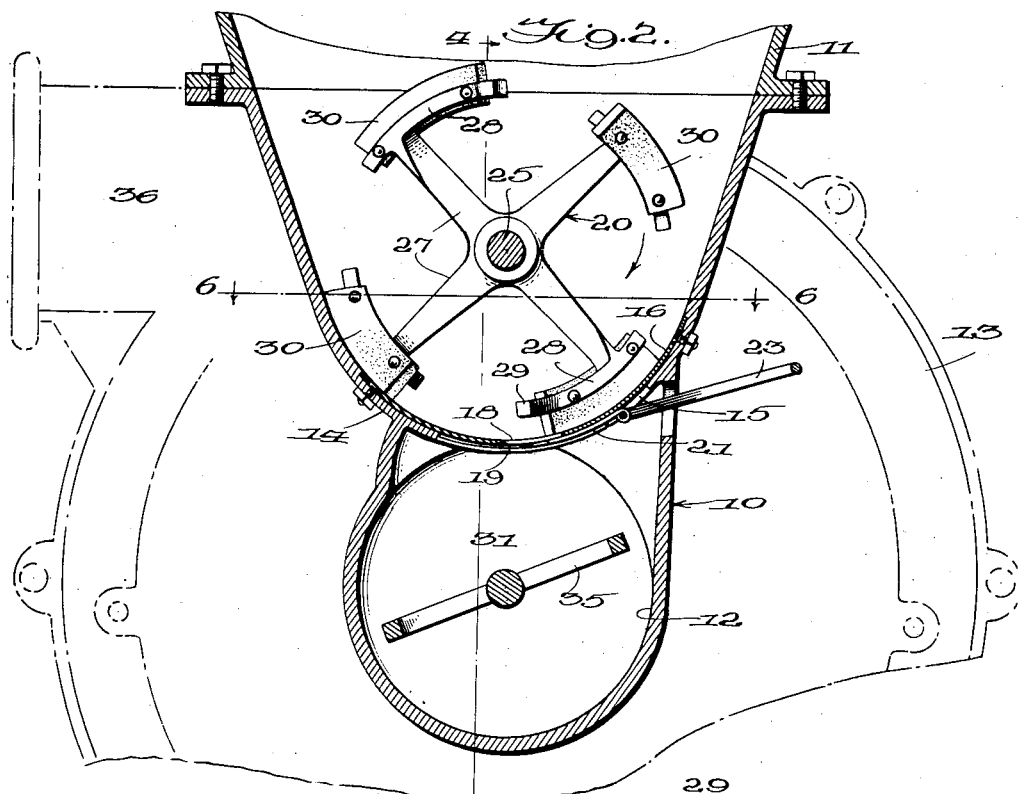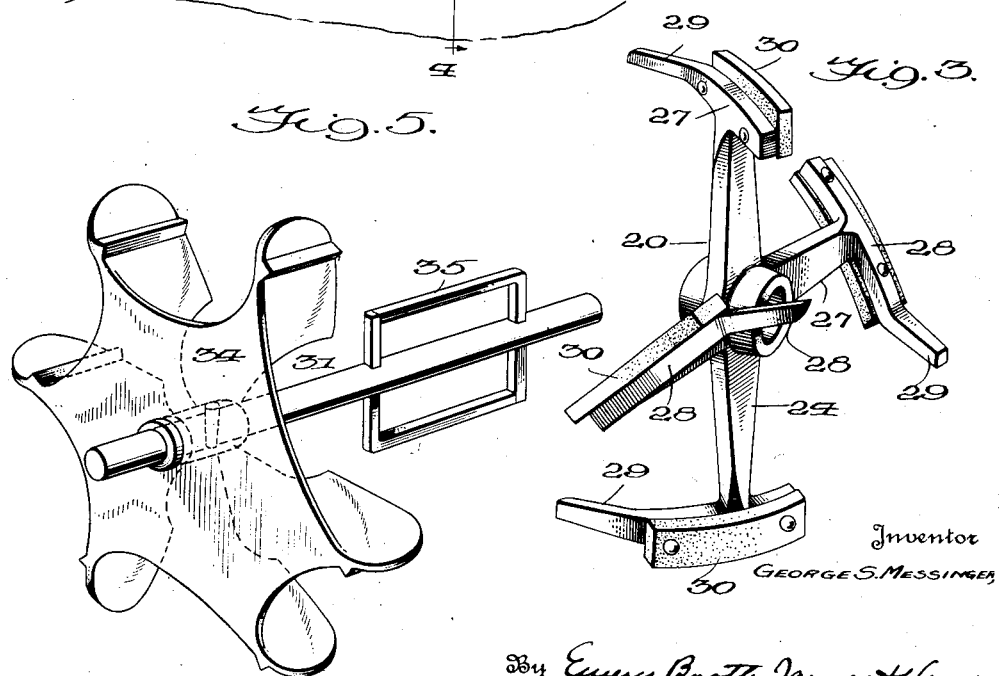

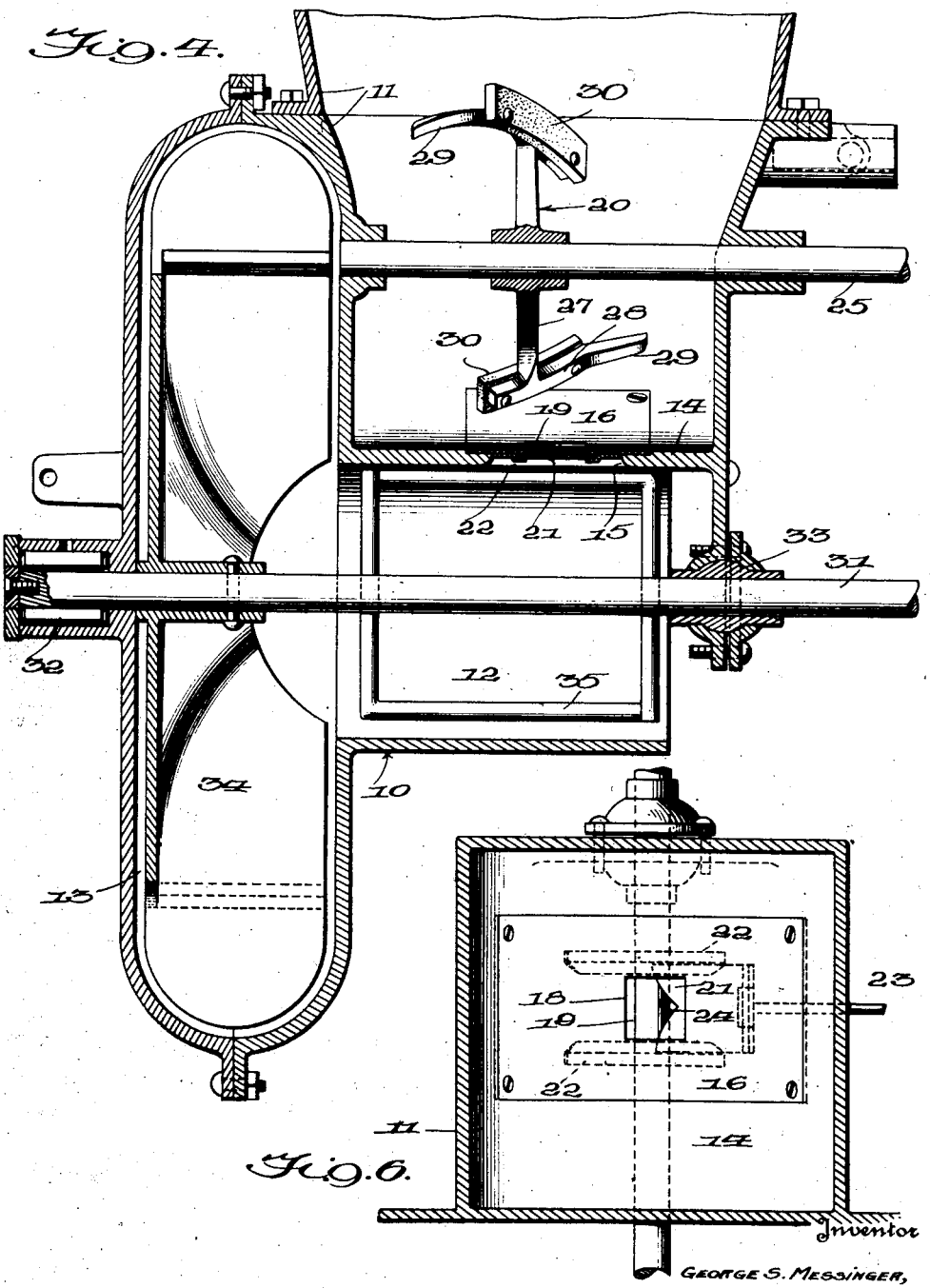

June 11, 1929.  G. S. MESSINGER  1,716,970
METHOD AND APPARATUS FOR DUSTING INSECTICIDE
AND FUNGICIDE POWDERS UPON PLANTS
Filed Nov. 28, 1927   4 Sheets-Sheet 4
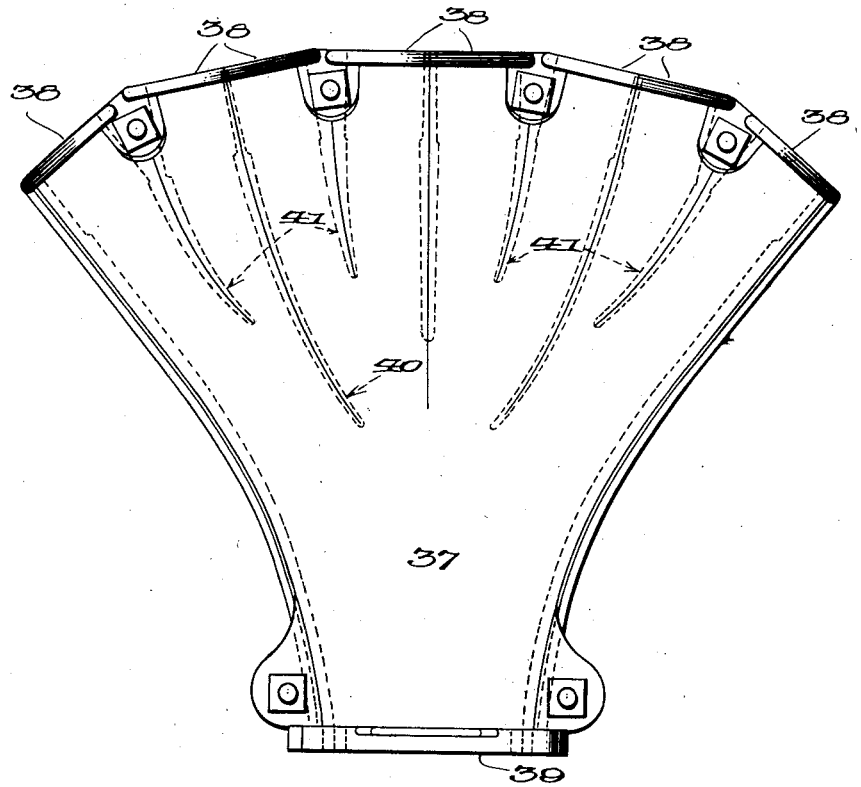
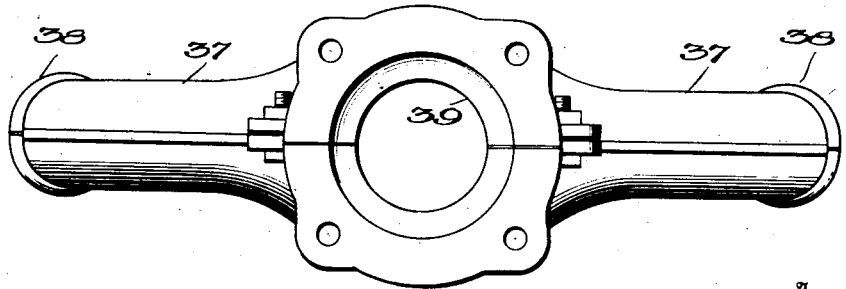
Inventor
GEORGE S. MESSINGER,
Attorney Patented June 11, 1929.

1,716,970

UNITED STATES PATENT OFFICE.

GEORGE S. MESSINGER, OF TATAMY, PENNSYLVANIA.

METHOD AND APPARATUS FOR DUSTING INSECTICIDE AND FUNGICIDE POWDERS UPON PLANTS.

Application filed November 28, 1927. Serial No. 236,326.

This invention relates to the method and means for dusting or "dry" spraying insecticide and fungicide powders upon ground plants and trees, and aims generally to improve such methods and means.

Insect pests which destroy orchard or truck crops are grouped into two general classes: (1) those which suck the juices from the plant and which may be most effectively combated by gassing them and (2) those which chew the bud, fruit, or foliage and which may be effectively combated by depositing a suitable poison upon the plant or tree and thus kill the insects. The principal method for successfully combating such pests is by dusting a poisonous powder upon the plant or tree, in the case of chewing insects, or by dusting a powder containing a poisonous gas for the sucking variety.

Powder dusters adaptable for the dusting or "dry" spraying of plants and trees are of two main varieties: (1) those which attempt to mix the dust with the air at the discharge of the fan or blower and (2) those which mix the dust with the air at the intake of the fan or blower.

Among the main aims and objects of my present invention is the improvement of the method and machines of the latter type, above described, whereby the dust and air are uniformly mixed before the dust enters the fan or blower chamber and are then more thoroughly mixed therein, thus insuring a uniform deposit of dust upon a given area of surface to be dusted; to discharge a well mixed dust cloud upon the plant at such high velocity, as to force the dust into every crevice of the plant foliage producing a uniform coating of dust upon all portions of the plant; and to provide for the proper uniform feeding of the dust from the hopper, and a uniform discharge from each of the nozzles, where more than one are used.

In the accompanying drawings, wherein I have selected for illustrative purposes one form of apparatus, satisfactory for carrying out the method, Fig. 1 is a perspective view of the hopper, mixer and blower, parts of the housing being broken away better to illustrate the construction;

Fig. 2 is a vertical central sectional view of the mechanism shown in Fig. 1;

Fig. 3 is a detail perspective view of the agitator and force feed device;

Fig. 4 is a vertical sectional view taken on a line at right angles to the plane of Fig. 2;

Fig. 5 is a detail perspective view of the fan and mixing stirrer;

Fig. 6 is a detail sectional view taken on line 6—6 of Fig. 2 showing the hopper feed bottom;

Fig. 7 is a plan view of the multiway distributor; and

Fig. 8 is an end elevation of the distributor.

The construction illustrated in the accompanying drawings as embodying the principles of my invention, consists of a hopper, mixing chamber, fan and discharge nozzle, which when assembled, may be mounted, in any desirable manner, upon a portable frame suitable for the purpose, such as a wheeled cart, tractor or other vehicle. The particular type of vehicle, upon which the mixer and blower is mounted, is not material to the proper understanding of the invention, as, for instance, it may be mounted upon an animal drawn wheeled carriage and driven by means of a chain trained over a sprocket on one of the wheels, as is common in the art, or it may be mounted upon a motor propelled vehicle, and driven either from the vehicle motor or by a separate motor as desired, it being understood, that the machine is adapted to be transported and driven in a variety of ways suitable for the particular work to be done and circumstances prevailing.

The housing or casing 10 of my improved mechanism may be constructed in one or more parts depending upon the size and capacity of the machine, and is preferably shaped so as to provide a hopper 11 for the powder, a mixing chamber 12 and a fan chamber 13. In the embodiment shown, the hopper is arranged alongside the upper portion of the fan chamber and directly above the mixing chamber, the latter extending laterally from the fan chamber and axially thereof.

The hopper 11 is preferably formed with an arcuate bottom portion 14 provided with an opening 15, which is covered by a smooth arcuate bottom plate 16, formed with a discharge opening 18 within the opening 15. One edge 19 of the opening 18, (see Fig. 2)

is formed with a knife edge and is adapted to co-operate with the force feed device 20 referred to later. Regulation of the amount of powder discharged from the hopper through the opening 18 into the mixing chamber 12, may be made by means of an adjustable feed slide 21, mounted in guideways 22 and movable by means of a rod 23, said slide having a V-shaped opening 24 therein arranged to cooperate with the knife edge 19 of the discharge opening 18. The amount of powder discharged from the hopper into the mixing chamber, is regulated by the length of the edge 19 of the opening 18 that is uncovered by the feed slide 21. Hence, it is evident that as the slide 21 is adjusted toward the edge 19, the converging edges of the V-shaped opening 24 decrease the effective width of the opening 18 at the edge 19 and thus decrease the discharge into the mixing chamber.

For the purpose of maintaining a uniform feeding or discharge of powder from the hopper 11 into the mixing chamber 12, I have provided a force feed device 20, secured to a shaft 25 mounted for rotation within the bottom portion of the hopper 11, and adapted to be driven at a comparatively slow speed through the sprocket directly or indirectly from any suitable source of power available. The force feed device illustrated herein, includes a spider 27 having four feeding or wiping arms 28 attached or formed on the ends of the spider arms, each of said arms being angularly disposed with respect to the axis of the shaft 25, and the alternate arms being disposed at opposite angular inclinations. Projecting laterally and slightly forwardly from the advanced end of each arm 28 is a gathering arm 29, the arrangement permitting of the gathering of the powder from the sides of the hopper, and sweeping it toward and across the discharge opening 18. Each of the arms 28 is further provided on its forward face with a wiping element 30 of leather or other suitable material adapted for coaction with the knife edge 19 of the opening 18. As will be apparent, the angular disposition of the arms 28 will feed the powder, first from one side of the hopper toward the opening, and then from the other side, insuring an adequate supply of powder to the mixing chamber, as long as any powder remains in the hopper. Furthermore, a uniform discharge of powder into the mixing chamber is assured.

As the powder is discharged from the hopper, it enters the mixing chamber 12, where it is thoroughly mixed with air. As pointed out above, the mixing chamber is in communication, at one end, with the fan chamber 13, axially thereof, and as shown in Figs. 1 and 4, is open at the opposite end, said open end constituting an air inlet for the mixing chamber and fan chamber. A shaft 31 is mounted for rotation in the housing 10 axially of the fan chamber and mixing chamber, the shaft being journalled in an anti-friction bearing 32 on the fan chamber housing and in a bearing 33 on the hopper housing, adjacent the open end of the mixing chamber. Secured upon the shaft 31 is a fan member 34 positioned within the fan chamber 13, and a mixing stirrer 35 within the mixing chamber 12. As shown in Fig. 5, the mixing stirrer 35 may advantageously be made of a single piece of metal bar material bent to rectangular shape, the end portions thereof passing through apertures in the shaft, so that the mixing stirrer may be secured to the shaft.

The blower, comprising in the form illustrated the fan member 34 and chamber 13, is preferably of the centrifugal type, having an axial inlet through the mixing chamber 12 and a tangential peripheral discharge outlet 36. See Figs. 1 and 2. The fan and stirrer shaft 31 is driven from any suitable source of power, advantageously from the same source as the shaft 25, through suitable speed increasing gearing (not shown), and preferably the fan shaft is rotated at a speed greatly in excess of the speed of revolution of the shaft 25. I find that best results are obtained when the fan shaft is driven at not less than 3000 R. P. M., thus discharging a current of air at high velocity necessary to penetrate each crevice of the plant and apply a uniform coating of dust upon each part of the plant.

In the dusting of truck crops, such as potatoes, cotton and like plants, it is desirable to direct the dust blast against the plants from opposite sides, and in some instances from opposite sides and from above the plants. For this purpose I have provided a distributor 37 adapted to be suitably secured directly to the discharge outlet 36 of the blower (see Fig. 1) and to uniformly distribute the dust and air from the blower to a plurality of nozzles (not shown) as will be readily understood by those skilled in the art. In Figs. 7 and 8 I have shown a multi-way distributor, adapted to distribute uniformly, both as to volume and velocity, the contents of the discharge into eight separate outlets 38.

As shown, the distributor 37 is preferably in the form of a fan-shaped casing, advantageously formed of upper and lower half sections, bolted together (see Fig. 1). The inlet end 39 of the distributor is of a size and shape to correspond to the size and shape of the fan discharge outlet 36, and the distributor is so shaped that the combined areas of the discharge outlets 38 closely approximate the area of the inlet end 39. The distributor casing is divided into a plurality of passages leading to the outlets 38 by a plurality of relatively long vanes or divisions 40, and intermediate shorter vanes or divisions 41, each of the vanes or divisions 40 and 41 having their innermost ends curved slightly toward the central axis of the distributor, so as better to divide and distribute the dust blast from the center thereof which is of the highest velocity.

When it is desired to dust or dry spray grown trees and the like, the distributor 37 is dispensed with and a single hose and nozzle (not shown) is connected to the discharge outlet 36. By reason of the high velocity of the dust blast discharged from the blower, it is possible to throw a dust spray over eighty feet high thereby fully to cover trees with a film of dust.

In order to prevent arching of the powdered material within the hopper, as experienced when certain kinds of insecticide and fungicide powders are used, I may provide an agitator 42 mounted for rotation in the hopper above the feeding mechanism 20, and adapted to be driven from any suitable source, as for instance, by a chain 43 and sprockets 44 from the shaft 25. Thus a constant and generous supply of powder for the feeder 20 is insured.

According to my improved method, which is advantageously carried out by apparatus of the type shown and described herein, the insecticide or fungicide dust or powder, which is very fine, varying from powder which will pass 100% through a 100 mesh per inch screen to a powder which will pass through a 300 to 380 mesh per inch screen, is uniformly fed to the mixing chamber 12 by the wiping action of the inclined blades of the force feed device over the discharge outlet 18 in the hopper 11. The powder enters the mixing chamber 12 in a thin continuous stream, where it is immediately thoroughly and uniformly mixed by the stirrer rotating at high speed with air drawn into the mixing chamber 12 by the fan. The air and dust, thus uniformly mixed, is drawn into the fan and discharged through the single discharge outlet 36 or through the outlets 38 of the distributor. Proper adjustment of the feed bottom slide permits of regulating the amount of dust per acre of surface covered.

When it is desirable to distribute the blast from the blower through a plurality of nozzles (not shown) I preferably directly connect the distributor, see Fig. 7, to the discharge outlet of the blower. I find that much better results are obtained by this method than when the material is distributed at a point removed from the blower, as at the nozzles, as is a common practice. In thus distributing the material at the blower outlet, I avail myself of all of the advantages of the blower in assisting in the thorough mixing of the air and dust, and avoid such differences in velocity as are experienced when the distributor is removed from the blower, and connected thereto by a flexible hose.

What I claim is:

1. The method of dusting or dry spraying insecticide or fungicide powders which consists in uniformly delivering a predetermined quantity of powder into a mixing chamber, thoroughly mixing such powder with air in said chamber, drawing such mixed powder and air into a blower and forcibly discharging it therefrom at a high velocity and directing such discharge blast upon the plant or tree to be dusted or sprayed.

2. The method of dusting or dry spraying insecticide or fungicide powders which consists in forcibly feeding and uniformly delivering a predetermined quantity of powder into a mixing chamber, thoroughly mixing such powder with air in said chamber, drawing such mixed powder and air into a blower and forcibly discharging it therefrom at a high velocity and directing such discharge blast upon the plant or tree to be dusted or sprayed.

3. The method of dusting or dry spraying insecticide or fungicide powders which consists in uniformly delivering a predetermined quantity of powder into a mixing chamber, thoroughly stirring and mixing such powder with air in said chamber, drawing such mixed powder and air into a blower and forcibly discharging it therefrom at a high velocity and directing such discharge blast upon the plant or tree to be dusted or sprayed.

4. The method of dusting or dry spraying insecticide or fungicide powders upon plant life which consists in uniformly delivering a regulated amount of powder into a mixing chamber, thoroughly stirring such powder and mixing it with a large volume of air to produce a fine suspension of dust, drawing the mixed dust and air into a blower and forcibly discharging it therefrom at a high velocity, and equally distributing the suspension into a plurality of channels immediately as it is discharged from the blower.

5. The method of dusting or dry spraying insecticide or fungicide powders upon plant life which consists in uniformly delivering a regulated amount of powder into a mixing chamber, thoroughly stirring such powder and mixing it with a large volume of air to produce a fine suspension of dust, accelerating the velocity of the mixed air and dust, distributing the air and dust equally into a plurality of channels and directing the dust upon the plant at a sufficiently high velocity so that it will penetrate each crevice of the foliage and plant.

6. A dusting machine for preparing highly pulverulent insecticide and fungicide powders ready for application to plant life, comprising a hopper, a mixing chamber below the hopper, provided with an air inlet and with means for mixing air and powder passing therethrough a blower adjacent the hopper and mixing chamber and having communication with the latter axially thereof to provide an axial inlet for air into the blower, a tangentially disposed peripheral discharge for the blower, and means for uniformly feeding a regulated amount of powder from the hopper into the mixing chamber.

7. A dusting machine for preparing highly pulverulent insecticide and fungicide powders ready for application to plant life, comprising a hopper, a mixing chamber below the hopper, provided with an air inlet and with means for mixing air and powder passing therethrough, a blower adjacent the hopper and mixing chamber and having communication with the latter axially thereof to provide an axial inlet for air into the blower, a tangentially disposed peripheral discharge for the blower, and rotary means for uniformly feeding a regulated amount of powder from the hopper into the mixing chamber.

8. A dusting machine for preparing highly pulverulent insecticide and fungicide powders ready for application to plant life, comprising a hopper, mixing chamber and blower arranged in the order named, said mixing chamber being open ended and constituting an axial inlet for said blower, a combined agitator and feeding device rotatably mounted in said hopper, a mixing device rotatably mounted in said mixing chamber, means for rotating said feeding and mixing devices, and means for regulating the amount of powder fed from said hopper to said mixing chamber.

9. A dusting machine for preparing highly pulverulent insectitude and fungicide powders ready for application to plant life, comprising a hopper, mixing chamber and blower arranged in the order named, said mixing chamber being open ended and constituting an axial inlet for said blower and being provided with means whereby to uniformly mix air and powder passing therethrough, the bottom of the hopper being of arcuate shape and provided with a feeding outlet therein leading to said mixing chamber, and feeding means rotatably mounted in said hopper adapted to uniformly feed the powder across and into the outlet alternately from opposite sides thereof.

10. A dusting machine for preparing highly pulverulent insecticide and fungicide powders ready for application to plant life, comprising a hopper, mixing chamber and blower arranged in the order named, said mixing chamber being open ended and constituting an axial inlet for said blower and being provided with means whereby to uniformly mix air and powder passing therethrough, the bottom of the hopper being of arcuate shape and provided with a feeding outlet therein leading to said mixing chamber, and feeding means rotatably mounted in said hopper adapted to uniformly feed the powder across and into the outlet alternately from opposite sides thereof, and means for regulating the size of said outlet and the amount of powder fed therethrough.

11. A dusting machine for preparing highly pulverulent insecticide and fungicide powders ready for application to plant life, comprising a hopper, mixing chamber and blower arranged in the order named, said mixing chamber being open ended and constituting an axial inlet for said blower and being provided with means whereby to uniformly mix air and powder passing therethrough, the bottom of the hopper being of arcuate shape and provided with a feeding outlet therein leading to said mixing chamber, a combined agitator and feeder rotatably mounted in said hopper having a plurality of angularly disposed agitating feeding blades angularly disposed with respect to the axis of the feeder, alternate blades being oppositely inclined with respect to the axis of the feeder whereby to uniformly feed the powder across and into the outlet alternately from opposite sides thereof.

12. In a dusting machine for preparing highly pulverulent insectitude and fungicide powders ready for application to plant life, the combination of apparatus for uniformly feeding the pulverulent material, including a hopper and a chamber below and communicating therewith through a feed opening, a material feeding member rotatably mounted in the hopper and having a plurality of angularly disposed peripheral feeding blades, the alternate blades being oppositely inclined whereby to feed the material uniformly across and into the opening from opposite sides thereof, said chamber having an inlet for air and an outlet, a blower communicating with said outlet, and means in said chamber for uniformly mixing powder and air fed through said chamber to supply a uniform suspension of powder in air to said blower.

13. In a dusting machine for preparing highly pulverulent insecticide and fungicide powders ready for application to plant life, the combination of apparatus for uniformly feeding the pulverulent material, including a hopper and a chamber below and communicating therewith through a feed opening, a material feeding member rotatably mounted in the hopper and having a plurality of angularly disposed peripheral feeding blades, the alternate blades being oppositely inclined whereby to feed the material uniformly across and into the opening from opposite sides thereof, said chamber having an inlet for air and an outlet, a blower communicating with said outlet, and means in said chamber for uniformly mixing powder and air fed through said chamber to supply a uniform suspension of powder in air to said blower and means for adjusting the effective width of said opening thereby to regulate the rate of flow of material therethrough.

14. A dusting machine for preparing highly pulverulent insecticide and fungicide powders ready for application to plant life, comprising a hopper, mixing chamber and blower arranged in the order named, said mixing chamber being open ended and constituting an axial inlet for said blower, means in said hopper for forcibly and uniformly feeding material therefrom into said mixing chamber, a shaft rotatably mounted axially of the blower and mixing chamber, a fan on the shaft within the blower chamber, a stirrer on the shaft within the mixing chamber, and means for rotating said shaft at a relatively high speed whereby the powder entering the mixing chamber is thoroughly mixed with and suspended in a current of air drawn through the open end of the mixing chamber and into the blower.

15. A dusting machine for preparing highly pulverulent insecticide and fungicide powders ready for application to plant life, comprising a hopper, mixing chamber and blower arranged in the order named, said mixing chamber being open ended and constituting an axial inlet for said blower, means in said hopper for forcibly and uniformly feeding material therefrom into said mixing chamber, a shaft rotatably mounted axially of the blower and mixing chamber, a fan on the shaft within the blower chamber, a stirrer on the shaft within the mixing chamber, and means for rotating said shaft at a relatively high speed whereby the powder entering the mixing chamber is thoroughly mixed with and suspended in a current of air drawn through the open end of the mixing chamber and into the blower, a discharge outlet for the blower, and means connected with said discharge outlet for uniformly distributing the air and powder discharged therefrom into a plurality of separate passages.

16. In a dusting machine in combination, a hopper for highly pulverulent dusting powder, a chamber below and communicating therewith through a feed opening and having an air inlet and a discharge outlet, said feed opening having one edge thereof formed as a knife edge, a material feeding member rotatably mounted in the hopper and having a plurality of angularly disposed peripheral feeding blades the alternate blades being oppositely inclined and each of said blades being provided with yielding wiping members adapted for cooperation with the knifed edge of said opening, thereby to feed the material thereacross and maintain uniform positive feed of the same to said chamber on continuous operation of said feeding member, a blower connected to said discharge outlet to draw air through said chamber, and means in said chamber to mix the uniformly delivered pulverulent material with the air to supply a uniform suspension of powder in air to said blower.

17. In a dusting machine in combination, a hopper, a chamber below and communicating therewith through a feed opening and having an air inlet and a discharge outlet, said feed opening having one edge thereof formed as a knife edge, a material feeding member rotatably mounted in the hopper and having a plurality of angularly disposed peripheral feeding blades the alternate blades being oppositely inclined whereby to feed pulverulent material uniformly across and into the opening from opposite sides thereof and each of said blades being provided with yielding wiping members adapted for cooperation with the knife edge of said opening, means including a slide having a V-shaped opening facing said knifed edge for adjusting the effective width of said opening thereby to regulate the rate of flow of material therethrough, a blower connected to said discharge outlet to draw air through said chamber, and means in said chamber to mix the uniformly delivered pulverulent material with the air to supply a uniform suspension of powder in air to said blower.

In testimony whereof, I have signed my name to this specification.

GEORGE S. MESSINGER.